US012771820B2

(12) United States Patent
Tahara et al.

(10) Patent No.: US 12,771,820 B2
(45) Date of Patent: Oct. 20, 2026

(54) INFORMATION PROCESSING DEVICE, INFORMATION PROCESSING METHOD, AND INFORMATION PROCESSING SYSTEM

(71) Applicant: Sony Group Corporation, Tokyo (JP)

(72) Inventors: Daisuke Tahara, Kanagawa (JP); Kei Kakidani, Kanagawa (JP); Koji Kamiya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 480 days.

(21) Appl. No.: 18/279,532

(22) PCT Filed: Jan. 25, 2022

(86) PCT No.: PCT/JP2022/002503
§ 371 (c)(1),
(2) Date: Aug. 30, 2023

(87) PCT Pub. No.: WO2022/201825
PCT Pub. Date: Sep. 9, 2022

(65) Prior Publication Data

US 2024/0155102 A1 May 9, 2024

(30) Foreign Application Priority Data

Mar. 26, 2021 (JP) ................................ 2021-053268

(51) Int. Cl.
*G06T 7/73* (2017.01)
*H04N 17/00* (2006.01)

(52) U.S. Cl.
CPC ............. *H04N 17/002* (2013.01); *G06T 7/74* (2017.01); *G06T 2207/30244* (2013.01)

(58) Field of Classification Search
CPC .................................. G06T 7/70; G06T 7/74
See application file for complete search history.

(56) References Cited

U.S. PATENT DOCUMENTS

2012/0050524 A1* 3/2012 Rinner ...................... G06T 3/40
345/419
2015/0341536 A1* 11/2015 Huang .................. G04B 47/06
348/208.2
(Continued)

FOREIGN PATENT DOCUMENTS

EP 2640059 A1 9/2013
JP 2004-312281 A 11/2004
(Continued)

*Primary Examiner* — Michael H Hong
(74) *Attorney, Agent, or Firm* — Paratus Law Group, PLLC

(57) ABSTRACT

There is provided an information processing device, an information processing method, and an information processing system, capable of improving an accuracy of detection of an imaging direction of a camera without using a device having a specific function. The information processing device includes a deviation detection unit that detects a deviation of a first imaging direction based on a captured image, the first imaging direction being an imaging direction of an imaging device that is detected by the imaging device that captures an image to obtain the captured image, the imaging direction being associated with the captured image. The present technology can be applied to a camera control unit (CCU) that controls the imaging device.

25 Claims, 11 Drawing Sheets

(56) References Cited

U.S. PATENT DOCUMENTS

| | | | | |
|---|---|---|---|---|
| 2017/0102772 | A1 | 4/2017 | Hesch | |
| 2017/0227162 | A1* | 8/2017 | Saika | G03B 15/006 |
| 2019/0182424 | A1* | 6/2019 | Omari | H04N 23/685 |
| 2020/0278449 | A1 | 9/2020 | Nerurkar | |

FOREIGN PATENT DOCUMENTS

| | | | |
|---|---|---|---|
| JP | 2007-121575 | A | 5/2007 |
| JP | 2010-258801 | A | 11/2010 |
| JP | 2019-161444 | A | 9/2019 |
| KR | 10-2219843 | B1 | 2/2021 |

* cited by examiner

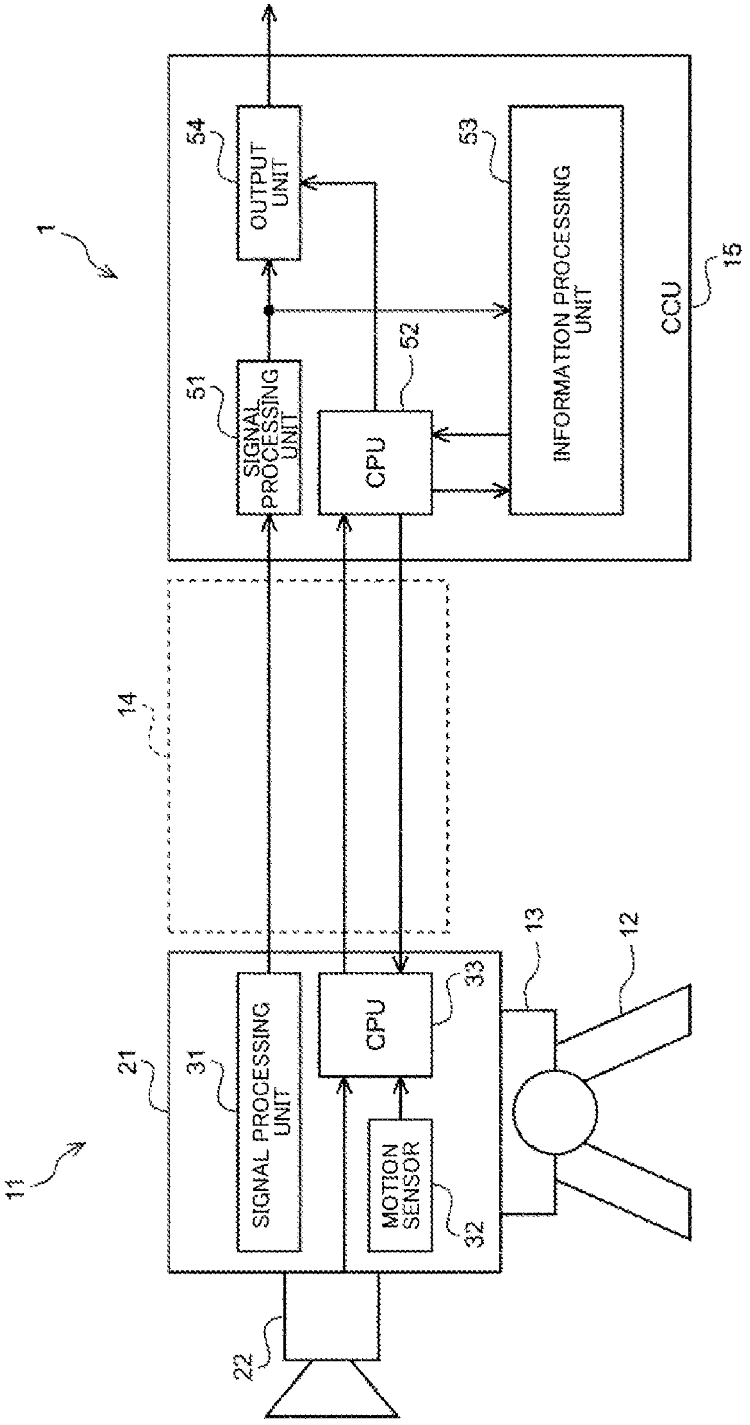
[Fig. 1]

[Fig. 2]
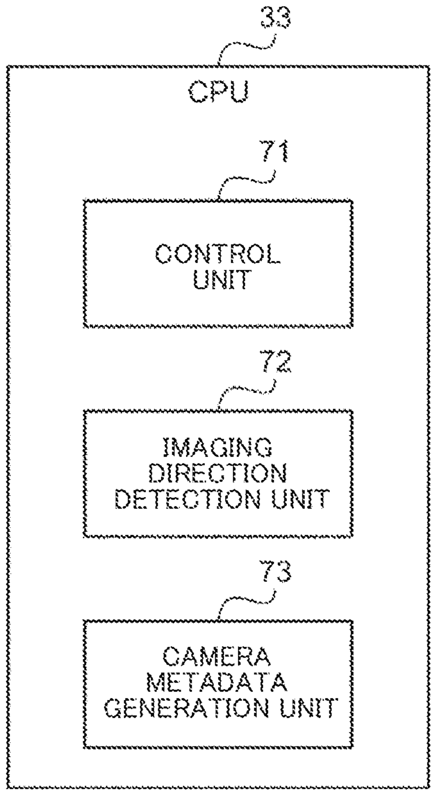
[Fig. 3]
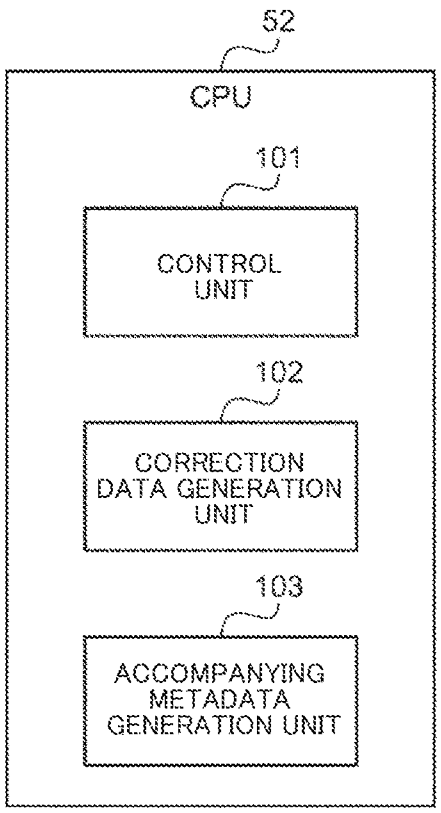

[Fig. 4]
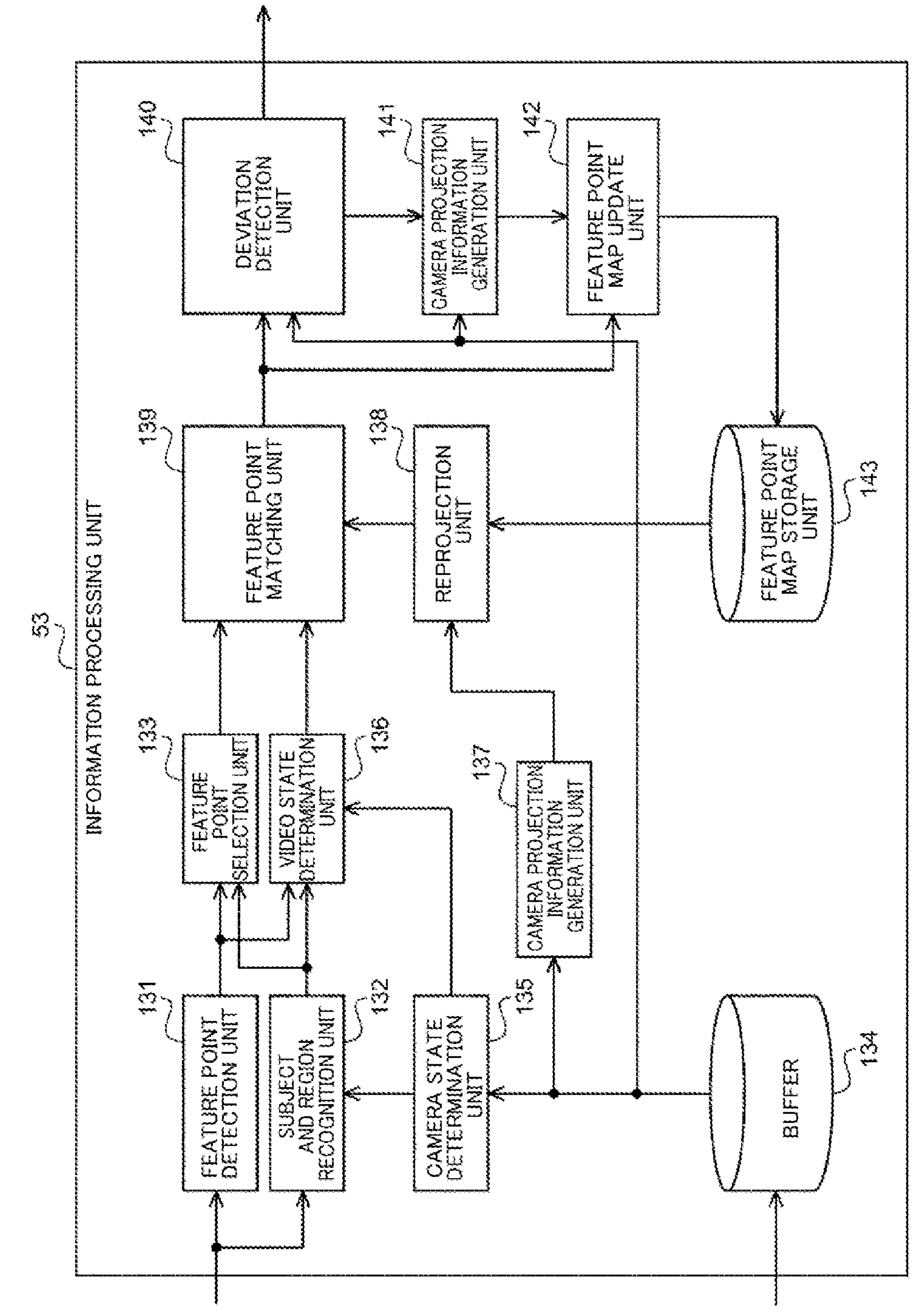

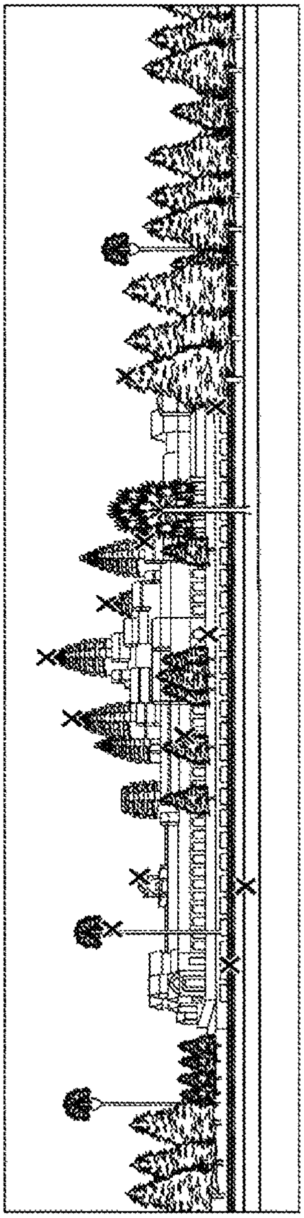
[Fig. 5]

[Fig. 6]
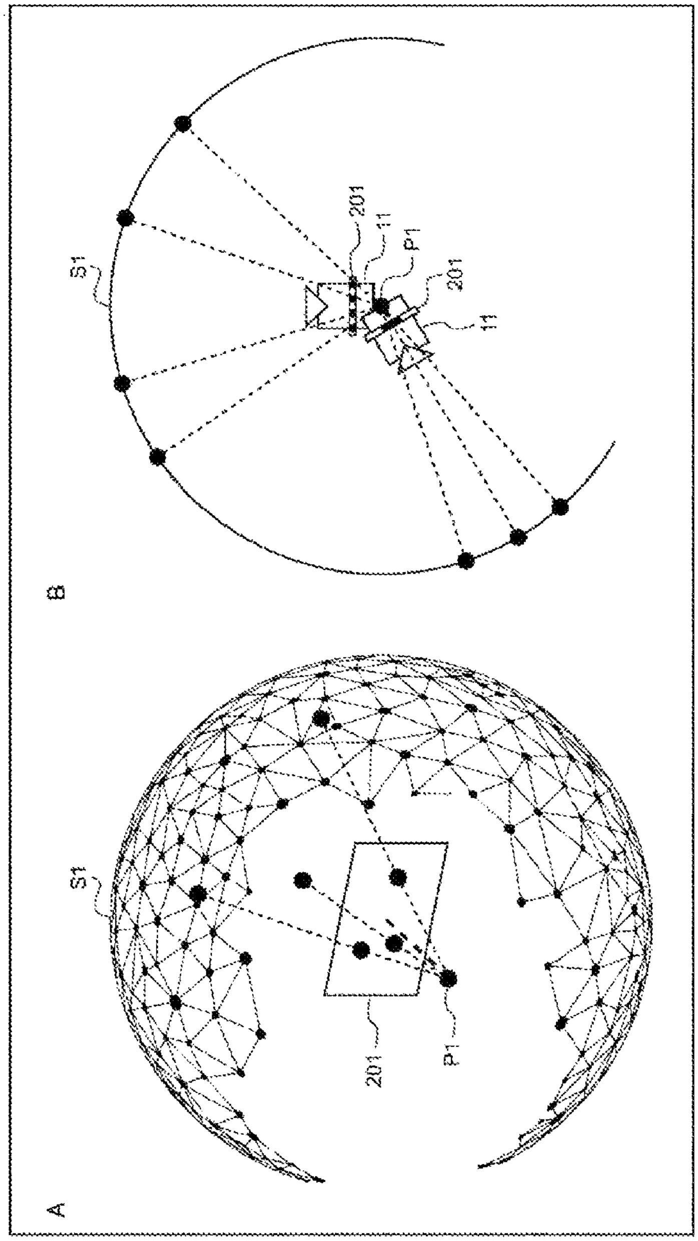

[Fig. 7]
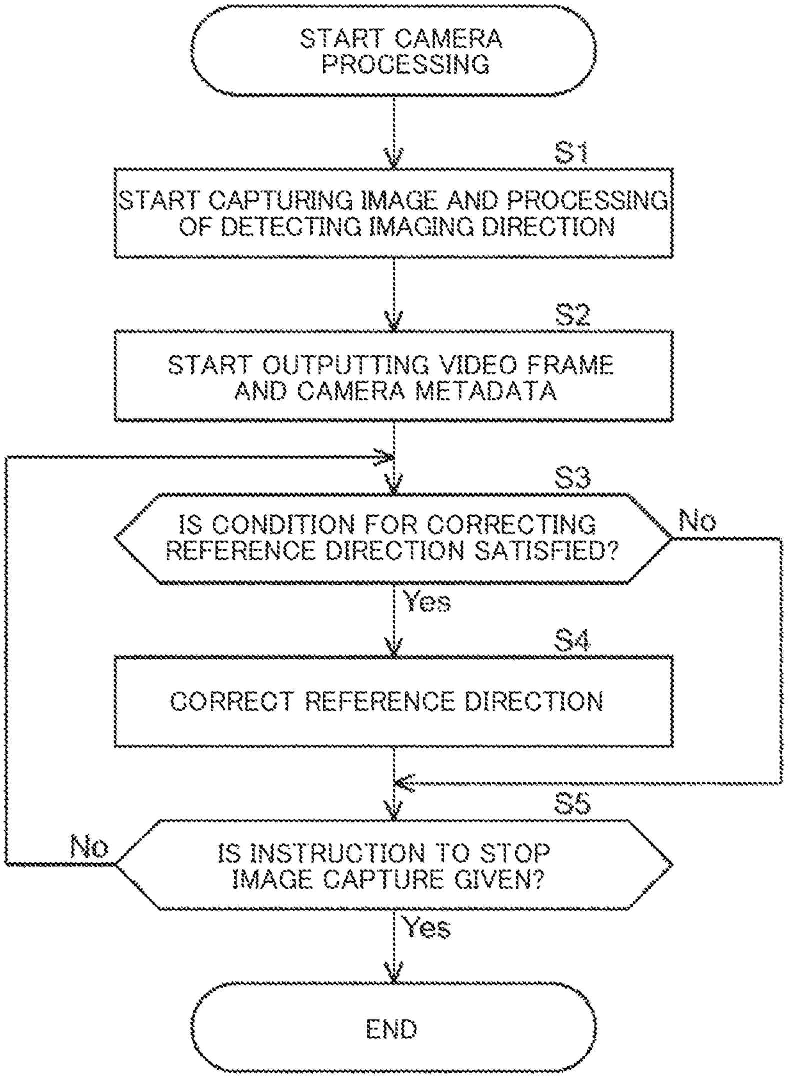

[Fig. 8]
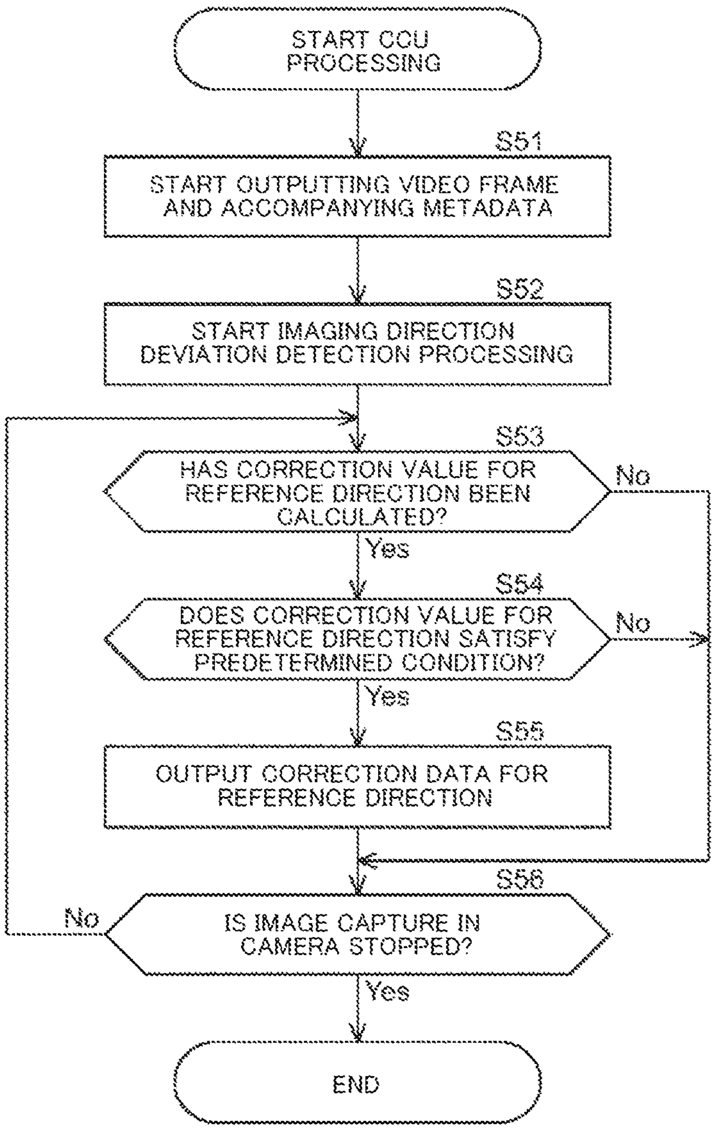

[Fig. 9]
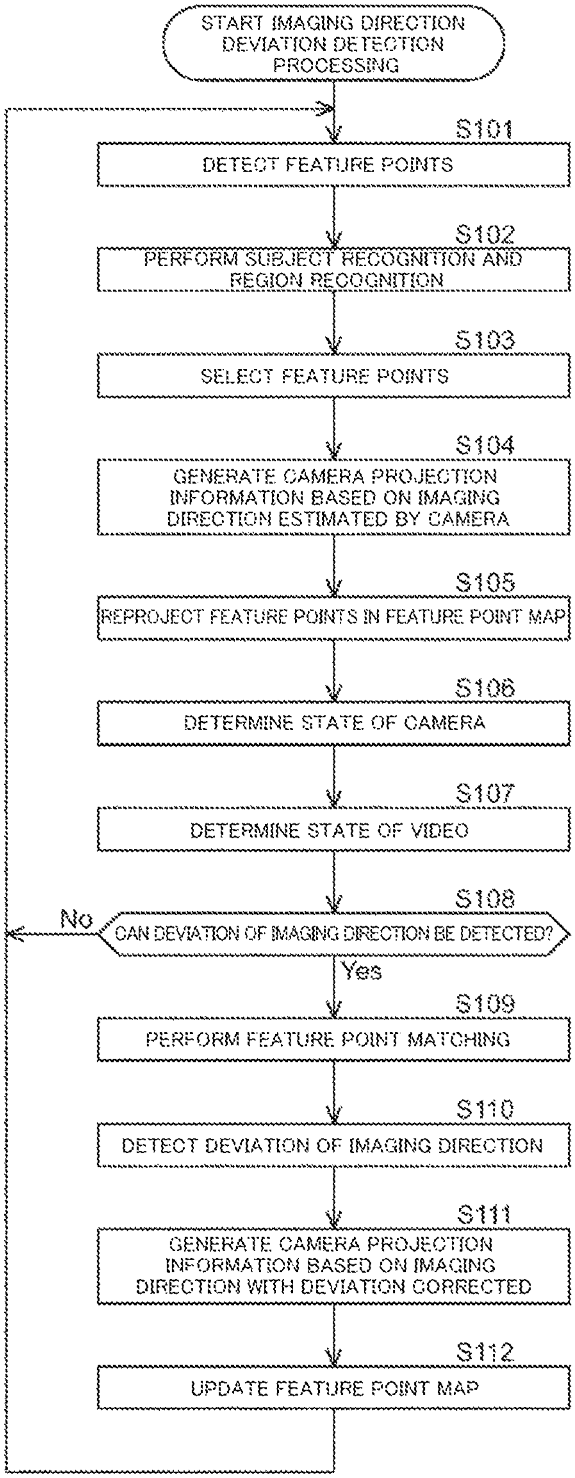

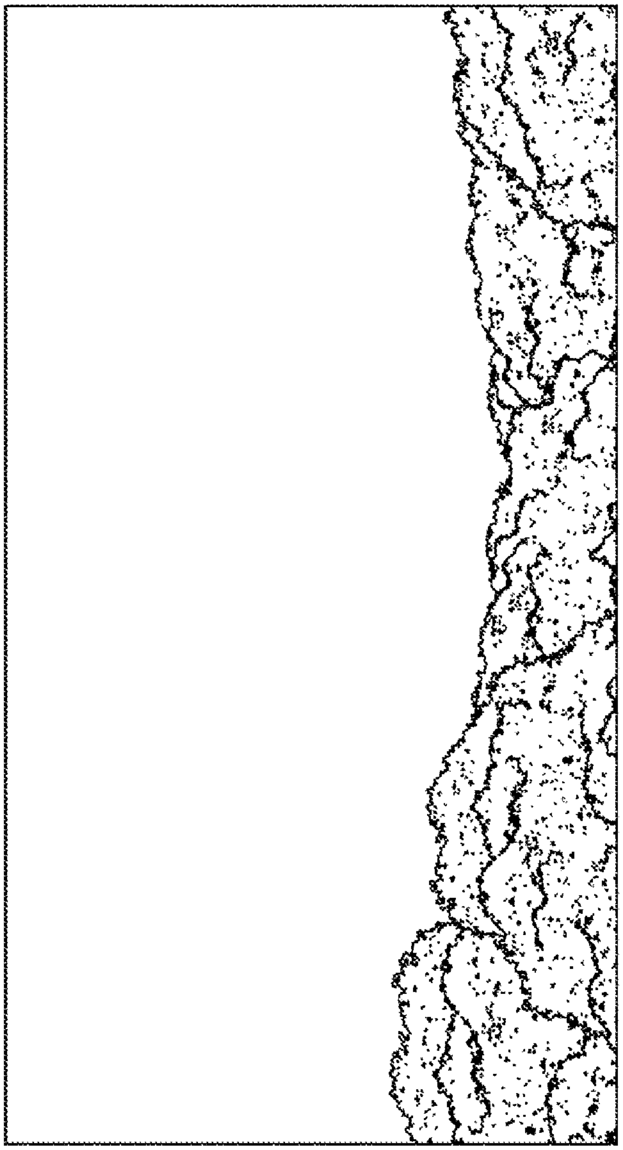
[Fig. 10]

[Fig. 11]
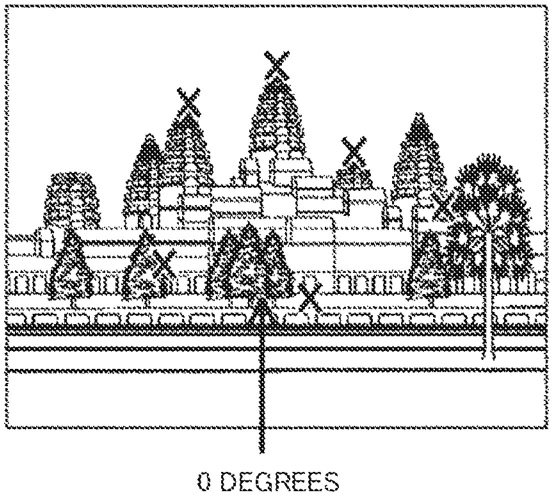
[Fig. 12]
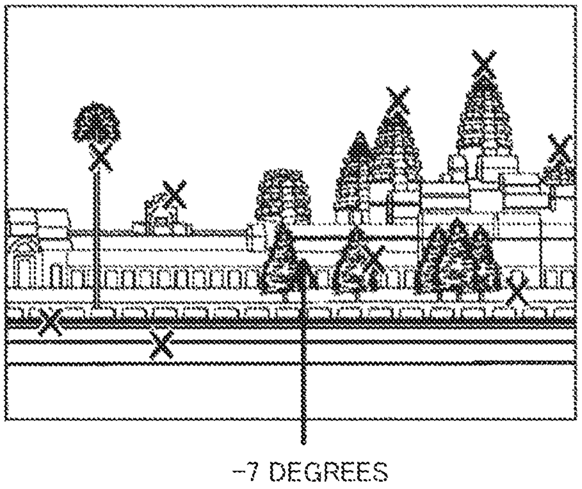

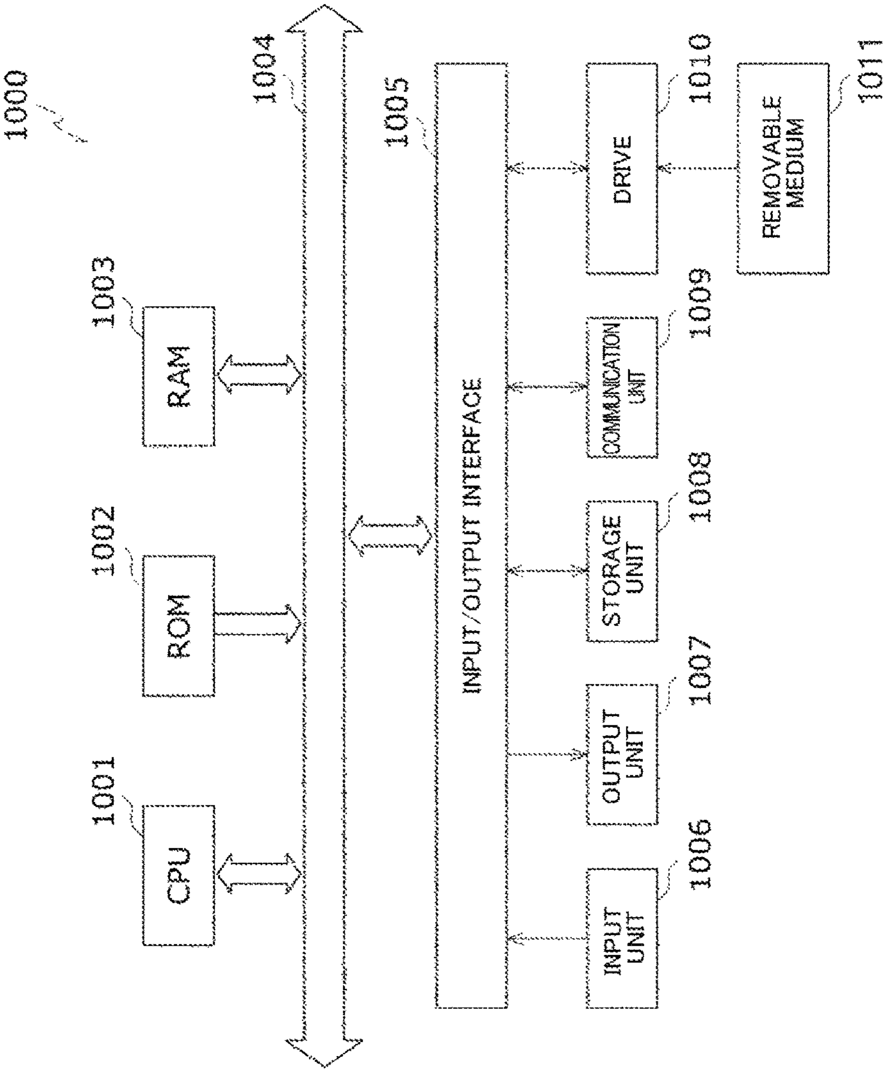
[Fig. 13]

INFORMATION PROCESSING DEVICE, INFORMATION PROCESSING METHOD, AND INFORMATION PROCESSING SYSTEM

CROSS REFERENCE TO PRIOR APPLICATION

This application is a National Stage Patent Application of PCT International Patent Application No. PCT/JP2022/002503 (filed on Jan. 25, 2022) under 35 U.S.C. § 371, which claims priority to Japanese Patent Application No. 2021-053268 (filed on Mar. 26, 2021), which are all hereby incorporated by reference in their entirety.

TECHNICAL FIELD

The present technology relates to an information processing device, an information processing method, and an information processing system, and more particularly to an information processing device, an information processing method, and an information processing system that improve the accuracy of detection of the imaging direction of a camera.

BACKGROUND ART

A technology has hitherto been proposed in which, when a camera is mounted on a camera platform, the camera platform performs initial processing including detection of a home position, which is the base point for panning or tilting, to accurately control the imaging direction of the camera (see PTL 1, for example).

CITATION LIST

Patent Literature

[PTL 1]
JP 2007-121575A

SUMMARY

Technical Problem

However, the invention described in PTL 1 requires a camera platform having a specific function to improve the accuracy of detection of the imaging direction of the camera.

The present technology has been made in view of such circumstances, and is intended to improve the accuracy of detection of the imaging direction of an imaging device without using an instrument such as a camera platform having a specific function.

Solution to Problem

An information processing device according to a first aspect of the present technology includes a deviation detection unit that detects a deviation of a first imaging direction based on a captured image, the first imaging direction being an imaging direction of an imaging device that is detected by the imaging device that captures an image to obtain the captured image, the imaging direction being associated with the captured image.

An information processing method according to a first aspect of the present technology includes detecting, by an information processing device, a deviation of an imaging direction of an imaging device based on a captured image, the imaging direction being detected by the imaging device that captures an image to obtain the captured image, the imaging direction being associated with the captured image.

In a first aspect of the present technology, a deviation of an imaging direction of an imaging device is detected on the basis of a captured image, the imaging direction being detected by the imaging device that captures an image to obtain the captured image, the imaging direction being associated with the captured image.

An information processing system according to a second aspect of the present technology includes an imaging device that captures an image to obtain a captured image; and an information processing device that controls the imaging device, wherein the imaging device includes an imaging direction detection unit that detects an imaging direction of the imaging device, and a metadata generation unit that generates metadata including the imaging direction detected by the imaging direction detection unit, and outputs the metadata in association with the captured image to the information processing device, and the information processing device includes a deviation detection unit that detects, based on the captured image, a deviation of the imaging direction included in the metadata.

In a second aspect of the present technology, an imaging direction of an imaging device is detected, metadata including the detected imaging direction is generated, the metadata is output in association with the captured image to the information processing device, and a deviation of the imaging direction included in the metadata is detected on the basis of the captured image.

BRIEF DESCRIPTION OF DRAWINGS

FIG. 1 is a block diagram illustrating an embodiment of an information processing system to which the present technology is applied.

FIG. 2 is a block diagram illustrating a functional configuration example of a CPU of a camera.

FIG. 3 is a block diagram illustrating a functional configuration example of a CPU of a CCU.

FIG. 4 is a block diagram illustrating a functional configuration example of an information processing unit of the CCU.

FIG. 5 illustrates an example of a feature point map.

FIG. 6 illustrates a method of generating a feature point map.

FIG. 7 is a flowchart illustrating camera processing.

FIG. 8 is a flowchart illustrating CCU processing.

FIG. 9 is a flowchart illustrating details of imaging direction deviation detection processing.

FIG. 10 illustrates an example of a video frame.

FIG. 11 illustrates an example of a result of detecting feature points.

FIG. 12 illustrates an example of reprojected feature points.

FIG. 13 is a diagram illustrating a configuration example of a computer.

DESCRIPTION OF EMBODIMENTS

An embodiment for implementing the present technology will be described below. The description will be made in the following order.

1. Example of Method of Detecting Imaging Direction of Camera
2. Embodiment
3. Modification Example
4. Others

1. Example of Method of Detecting Imaging Direction of Camera

First, an example of a method of detecting the imaging direction (orientation) of a camera will be described.

For example, there is known a method of detecting the imaging direction of a camera by using a tripod system into which an encoder for measuring the angle of a camera platform attached to a tripod is built, and transmitting the imaging direction together with a video.

However, this method requires the tripod system with the encoder.

For example, there is known a method of detecting the imaging direction of a camera by: detecting an angular velocity with a gyro sensor built into the camera; calculating the amount of change in the angle based on the detected angular velocity; and cumulatively calculating the amount of change in the angle with respect to a predetermined reference direction.

However, in this method, a phenomenon called "drift" occurs. Specifically, an accumulated error in the gyro sensor due to noise and the like causes a phenomenon in which the result of detecting the imaging direction of the camera gradually deviates. This deviation of the imaging direction can be substantially regarded as a deviation of the reference direction.

For example, there is known a method using an external system that detects the movement of the body of a camera and the movement of the focus ring and zoom ring of a lens.

Specifically for example, there is known a method using a video processing system that converts the position of a dedicated marker attached to a ceiling, the position of an external wide-angle camera, and the position of a dedicated marker captured by the wide-angle camera into camera orientation information.

For example, there is known a method of calculating an imaging direction of a camera in which an infrared camera system of a head-mounted display controller for virtual reality (VR) is installed, based on motion information of the infrared camera system.

For example, there is known a method of installing in a camera a positioning system (for example, Intel RealSense camera) using Light Detection and Ranging (LiDAR) or a compound-eye camera system.

However, in cases where these external systems are used, specialized skills are required, and complicated work such as installation and adjustment of the external systems is also required.

In addition, the applicable range is restricted. For example, when a dedicated marker is used, the applicable range is limited to a space having a ceiling or ground to which the dedicated marker can be attached. For example, when an infrared camera system is used, the applicable range is limited to a room-sized space due to restrictions on the imaging range of the infrared camera. For example, when a ranging system is used, there are distance constraints associated with active ranging or stereo ranging.

For example, there is known a method using Visual Inertial Odometry or Visual Inertial SLAM, which are technologies that combine image processing and a gyro sensor.

However, for example, in broadcast content, particularly sports broadcasts, a zoom operation using a zoom lens is frequently used, or a camera that is not selected for broadcast video is quickly panned. Therefore, the imaging range changes frequently and at high speed. In addition, a close-up scene is captured in which athletes and performers are taken in close-up while the surroundings are blurred. Due to such camera operations and video peculiarities, it is difficult to directly apply Visual Inertial Odometry or Visual Inertial SLAM.

2. Embodiment

Referring to FIGS. 1 to 12, an embodiment of the present technique will be described below.

<Configuration Example of Information Processing System>

FIG. 1 is a block diagram illustrating an embodiment of an information processing system 1 to which the present technology is applied.

The information processing system 1 includes a camera 11, a tripod 12, a camera platform 13, a camera cable 14, and a camera control unit (CCU) 15. The camera 11 is installed on the camera platform 13 attached to the tripod 12 so as to rotate in the pan, tilt, and roll directions and not move in the translation direction. The CCU 15 as referred to herein is an external device that controls the camera 11 and processes images captured by the camera 11. The camera 11 and the CCU 15 are connected by the camera cable 14. The camera 11 and the CCU 15 do not necessarily have to be connected by a physical cable, and may be connected through wireless communication, for example.

The camera 11 has a main body 21 and a lens 22. The lens 22 is installed in the main body 21. The main body 21 includes a signal processing unit 31, a motion sensor 32, and a CPU 33.

The lens 22 supplies lens information regarding the lens 22 to the CPU 33. The lens information includes, for example, control values and specifications of the lens 22 such as focal length, focal length, and iris value.

The signal processing unit 31 shares video signal processing with a signal processing unit 51 of the CCU 15. For example, the signal processing unit 31 performs predetermined signal processing on a video signal obtained by an image sensor (not illustrated) capturing an image of a subject through the lens 22, and generates a video frame from a captured image captured by the image sensor. The signal processing unit 31 outputs the video frame to the signal processing unit 51 of the CCU 15 via the camera cable 14.

The motion sensor 32 includes, for example, an angular velocity sensor and an acceleration sensor to detect the angular velocity and acceleration of the camera 11. The motion sensor 32 supplies the CPU 33 with data indicating the results of detecting the angular velocity and acceleration of the camera 11

The CPU 33 controls processing of each unit of the camera 11. For example, based on control signals input from the CCU 15, the CPU 33 changes the control values for the camera 11 and displays information on the control values on a viewfinder (not illustrated).

The CPU 33 detects the orientation (pan angle, tilt angle, roll angle) of the camera 11, that is, the imaging direction of the camera 11 based on the result of detecting the angular velocity of the camera 11. For example, the CPU 33 sets a reference direction in advance and cumulatively calculates (integrates) the amount of change in the orientation (angle) of the camera 11 with respect to the reference direction, thereby detecting the imaging direction (orientation) of the camera 11. The CPU 33 uses the result of detecting the acceleration of the camera 11 as necessary to detect the imaging direction of the camera 11.

The reference direction of the camera 11 as referred to herein is a direction in which the pan angle, tilt angle, and roll angle of the camera 11 are 0 degrees. The CPU 33 corrects the internally held reference direction based on correction data output from the CCU 15, as will be described later.

The CPU 33 generates camera metadata including information including the imaging direction of the camera 11 (hereinafter referred to as imaging direction information) and lens information. The CPU 33 outputs the camera metadata to a CPU 52 of the CCU 15 via the camera cable 14.

The CCU 15 includes the signal processing unit 51, the CPU 52, an information processing unit 53, and an output unit 54.

The signal processing unit 51 performs predetermined video signal processing on the video frame generated by the signal processing unit 31 of the camera 11.

The signal processing unit 51 supplies the information processing unit 53 and the output unit 54 with the video frame on which the video signal processing has been performed.

The CPU 52 controls processing of each unit of the camera 11. The CPU 52 supplies the camera metadata acquired from the camera 11 to the information processing unit 53. Based on the camera metadata, the CPU 52 generates accompanying metadata for embedding in an output signal and supplies the accompanying metadata to the output unit 54. Based on data indicating a correction value for the reference direction (offset value) supplied from the information processing unit 53 and the reliability of the correction value, the CPU 52 generates correction data for correcting the reference direction of the camera 11. The CPU 52 outputs the correction data to the camera 11 via the camera cable 14.

The information processing unit 53 performs various types of recognition processing using computer vision, artificial intelligence (AI), machine learning, and the like on the video frame. For example, the information processing unit 53 detects a deviation (error) of the imaging direction detected by the camera 11 based on the video frame and camera metadata. The information processing unit 53 calculates a correction value for the reference direction based on the detected deviation of the imaging direction, and calculates the reliability of the correction value for the reference direction. The information processing unit 53 supplies the CPU 52 with data indicating the correction value for the reference direction and the reliability of the correction value.

The output unit 54 arranges the video frame and the accompanying metadata in an output signal of a predetermined format (for example, a serial digital interface (SDI) signal) and outputs the resulting signal to a downstream device.

The description about the camera cable 14 will be omitted as appropriate in the processing of transmitting signals and data between the camera 11 and the CCU 15 hereinafter. For example, when the camera 11 outputs a video frame to the CCU 15 via the camera cable 14, the description of the camera cable 14 may be omitted and a simple description may be given that the camera 11 outputs a video frame to the CCU 15.

<Functional Configuration Example of CPU 33>

FIG. 2 illustrates a configuration example of functions implemented by the CPU 33 of the camera 11. For example, when the CPU 33 executes a predetermined control program, functions corresponding to a control unit 71, an imaging direction detection unit 72, and a camera metadata generation unit 73 are implemented.

The control unit 71 controls processing of each unit of the camera 11.

The imaging direction detection unit 72 detects the imaging direction of the camera 11 based on the result of detecting the angular velocity of the camera 11 by the motion sensor 32. The imaging direction detection unit 72 also uses the result of detecting the acceleration of the camera 11 as necessary. The imaging direction detection unit 72 corrects the reference direction of the camera 11 based on the correction data output from the CCU 15.

The camera metadata generation unit 73 generates camera metadata including imaging direction information and lens information of the camera 11. The camera metadata generation unit 73 outputs the camera metadata to the CPU 52 of the CCU 15.

<Functional Configuration Example of CPU 52>

FIG. 3 illustrates a configuration example of functions implemented by the CPU 52 of the CCU 15. For example, when the CPU 52 executes a predetermined control program, functions corresponding to a control unit 101, a correction data generation unit 102, and an accompanying metadata generation unit 103 are implemented.

The control unit 101 controls processing of each unit of the CCU 15.

The correction data generation unit 102 generates correction data based on the correction value for the reference direction of the camera 11 supplied from the information processing unit 53. The correction data generation unit 102 outputs the correction data to the CPU 33 of the camera 11.

The accompanying metadata generation unit 103 generates accompanying metadata based on the camera metadata acquired from the camera 11. The accompanying metadata generation unit 103 supplies the accompanying metadata to the output unit 54.

<Configuration Example of Information Processing Unit 53>

FIG. 4 illustrates a configuration example of the information processing unit 53 of the CCU 15. The information processing unit 53 includes a feature point detection unit 131, a subject and region recognition unit 132, a feature point selection unit 133, a buffer 134, a camera state determination unit 135, a video state determination unit 136, a camera projection information generation unit 137, a reprojection unit 138, a feature point matching unit 139, a deviation detection unit 140, a camera projection information generation unit 141, a feature point map update unit 142, and a feature point map storage unit 143.

The feature point detection unit 131 detects feature points in the video frame supplied from the signal processing unit 51, and calculates a feature vector of each detected feature point. The feature point detection unit 131 supplies the feature point selection unit 133 and the video state determination unit 136 with data indicating the position and feature vector of each detected feature point.

The subject and region recognition unit 132 performs recognition processing on the subject and region in the video frame supplied from the signal processing unit 51. The subject and region recognition unit 132 supplies the feature point selection unit 133 and the video state determination unit 136 with data indicating the results of recognizing the object and region in the video frame.

The feature point selection unit 133 selects feature points to be used for feature point matching from among the feature points detected by the feature point detection unit 131 based on the results of recognizing the subject and region in the video frame. The feature point selection unit 133 supplies the feature point matching unit 139 with data indicating the position and feature vector of each selected feature point.

The buffer 134 temporarily stores the camera metadata supplied from the CPU 52. Note that image processing of a video frame (detection of feature points, subject recognition, region recognition, feature point matching, and detection of deviation of imaging direction) requires a certain amount of time. The buffer 134 is used to delay the output of the camera metadata by the amount of time required for the image processing of the video frame so that it is synchronized with the video frame.

The camera state determination unit 135 determines the state of the camera 11 based on the imaging direction information and lens information included in the camera metadata stored in the buffer 134. Specifically, the camera state determination unit 135 determines whether or not the state of the camera 11 at the time of capturing of the video frame was suitable for detection of a deviation of the imaging direction. The camera state determination unit 135 supplies a camera state flag indicating the determination result to the video state determination unit 136.

The video state determination unit 136 determines the state of the image frame based on the results of detecting feature points and the results of recognizing the subject and region. Specifically the video state determination unit 136 determines whether or not the video frame is in a state suitable for detection of a deviation of the imaging direction. The video state determination unit 136 supplies the feature point matching unit 139 with the video state flag indicating the determination result and the camera state flag acquired from the camera state determination unit 135.

The camera projection information generation unit 137 generates, based on the imaging direction information and lens information stored in the buffer 134, camera projection information for reprojecting the feature points in the feature point map stored in the feature point map storage unit 143 onto the field of view of the camera 11. The camera projection information generation unit 137 supplies the camera projection information to the reprojection unit 138.

The reprojection unit 138 reprojects the feature points in the feature point map stored in the feature point map storage unit 143 onto the field of view of the camera 11 based on the camera projection information generated by the camera projection information generation unit 137. The reprojection unit 138 supplies the feature point matching unit 139 with data indicating the positions and feature vectors of the reprojected feature points.

The feature point matching unit 139 determines whether or not a deviation of the imaging direction can be detected on the basis of the camera state flag and the video state flag. When the feature point matching unit 139 determines that a deviation of the imaging direction can be detected, the feature point matching unit 139 makes a match between a group of feature points detected from the video frame (hereinafter referred to as the detected feature point group) and a group of feature points reprojected from the feature point map (hereinafter referred to as the reprojected feature point group). The feature point matching unit 139 supplies the deviation detection unit 140 and the feature point map update unit 142 with data indicating the result of feature point matching.

The deviation detection unit 140 detects a deviation (error) of the imaging direction detected by the camera 11 based on the result of making a match between the detected feature point group and the reprojected feature point group, and detects the imaging direction of the camera 11 with the deviation corrected. The deviation detection unit 140 calculates a correction value for the reference direction of the camera 11 based on the detected deviation of the imaging direction. The deviation detection unit 140 also calculates the reliability of the correction value for the reference direction based on one or more of the result of detecting feature points in the video frame and the result of feature point matching.

The deviation detection unit 140 supplies the camera projection information generation unit 141 with data indicating the detected imaging direction of the camera 11. The deviation detection unit 140 supplies the CPU 52 with the correction value for the reference direction of the camera 11 and the data indicating the reliability of the correction value.

The camera projection information generation unit 141 acquires the lens information of the camera 11 from the buffer 134. The camera projection information generation unit 141 generates camera projection information based on the imaging direction of the camera 11 detected by the deviation detection unit 140 and the acquired lens information. The camera projection information generation unit 141 supplies the generated camera projection information to the feature point map update unit 142.

The feature point map update unit 142 generates a feature point map indicating a distribution of feature points around the camera 11 based on the result of feature point matching and the camera projection information generated by the camera projection information generation unit 141. The feature point map update unit 142 stores the feature point map in the feature point map storage unit 143.

An example of the feature point map will now be described with reference to FIGS. 5 and 6.

FIG. 5 illustrates an example of the feature point map. The cross marks in the drawing indicate the positions of the feature points.

For example, the feature point map update unit 142 generates a feature point map indicating the positions and feature vectors of the feature points of a scene around the camera 11 and updates the feature point map by joining the feature points as detection results in a video frame obtained by capturing the surroundings of the camera 11. In this feature point map, the position of a feature point is represented by, for example, a direction with respect to the reference direction of the camera 11 and a distance in the depth direction.

As described above, in the information processing system 1, the camera 11 is installed so as not to move in the translational direction. In other words, the movement of the camera 11 includes only rotational components and does not include translational components. Therefore, the feature point map update unit 142 can generate and update the feature point map without using the distance in the depth direction.

Specifically, for example, as illustrated in A and B of FIG. 6, the feature point map update unit 142 generates a feature point map in which feature points on an image sensor 201 are radially projected about an optical center P1 of the camera 11 onto a three-dimensional spherical surface S1, and updates the feature point map. In this feature point map, for example, the position of a feature point is represented only by a position (latitude and longitude) on the spherical surface S1, and the distance in the depth direction is unnecessary. This facilitates the management of the feature point map.

<Processing of Information Processing System 1>

Next, processing of the information processing system 1 will be described.

<Processing of Camera 11>

First, processing of the camera 11 will be described with reference to the flowchart of FIG. 7.

This processing is started, for example, when the camera 11 is operated to start capturing an image.

In step S1, the camera 11 starts processing of capturing an image and detecting the imaging direction.

Specifically, the image sensor 201 starts processing of capturing an image and supplying the resulting video signal to the signal processing unit 31.

The signal processing unit 31 performs predetermined video signal processing on the video signal supplied from the image sensor 201, and starts processing of generating a video frame.

The motion sensor 32 detects the angular velocity and acceleration of the camera 11 and starts processing of supplying data indicating the detection result to the CPU 33.

The imaging direction detection unit 72 sets a reference direction for the camera 11 and stores it in a memory (not illustrated). Then, the imaging direction detection unit 72 starts processing of cumulatively calculating the amount of change in the orientation of the camera 11 based on the result of detecting the angular velocity of the camera 11, thereby calculating the pan angle, tilt angle, and roll angle of the camera 11 with respect to the reference direction.

The lens 22 starts supplying lens information to the CPU 33. As described above, the lens information includes, for example, the focal length, focus distance, and iris value of the lens 22.

In step S2, the camera 11 starts outputting a video frame and camera metadata.

Specifically, the signal processing unit 31 starts processing of outputting the video frame to the CCU 15.

The camera metadata generation unit 73 starts processing of generating camera metadata including imaging direction information and lens information of the camera 11. The camera metadata generation unit 73 starts processing of outputting the camera metadata to the CCU 15 in synchronization with the output of the video frame from the signal processing unit 31. As a result, the video frame is associated with the camera metadata including the imaging direction information and lens information of the camera 11 around the time of capturing the video frame.

In step S3, the imaging direction detection unit 72 determines whether or not the condition for correcting the reference direction is satisfied.

It takes a certain amount of time for processing of detecting a deviation of the imaging direction by the CCU 15, which will be described later. Therefore, the cycle of processing of detecting a deviation of the imaging direction is longer than the cycle of capturing an image (frame cycle) in the camera 11. In other words, the frequency of detecting a deviation of the imaging direction (for example, 10 Hz) is lower than the frame rate of the camera 11 (for example, 60 Hz). As will be described later, the CCU 15 generates and outputs correction data when the deviation of the imaging direction detected by the camera 11 is equal to or greater than a predetermined threshold. Therefore, there is a certain amount of time difference between the occurrence of a deviation of the imaging direction detected by the camera 11 and the input of correction data based on the deviation of the imaging direction into the camera 11.

Therefore, for example, if the imaging direction detection unit 72 acquires the correction data from the CCU 15 and immediately corrects the reference direction, the imaging direction changes abruptly, which may give an unnatural impression to a user (for example, a video engineer (VE)).

By contrast, even when the correction data is acquired from the CCU 15, the imaging direction detection unit 72 does not correct the reference direction until a predetermined condition is satisfied. For example, when the movement speed of the imaging direction of the camera 11 (for example, the rate of change in at least one of the pan angle and the tilt angle) is equal to or greater than a predetermined threshold, and the imaging direction detection unit 72 holds unused correction data, the imaging direction detection unit 72 determines that the condition for correcting the reference direction is satisfied, and then the processing proceeds to step S4.

In step S4, the imaging direction detection unit 72 corrects the reference direction based on the correction data.

Specifically, the imaging direction detection unit 72 uses, for example, alpha-blending (infinite impulse response (IIR) processing) to continuously correct the reference direction in a plurality of times. As a result, the reference direction changes gradually and smoothly, and the angle of view changes discontinuously, resulting in an effect in preventing an unnatural impression given to the user viewing the video, in addition to that of the determination processing in step S3.

Thereafter, the processing proceeds to step S5.

On the other hand, in step S3, for example, when the movement speed of the imaging direction of the camera 11 is less than the predetermined threshold, or when the imaging direction detection unit 72 does not hold unused correction data, the imaging direction detection unit 72 determines that the condition for correcting the reference direction is not satisfied, the processing of step S4 is skipped, and then the processing proceeds to step S5.

In step S5, the control unit 71 determines whether or not an instruction to stop the image capture is given. If it is determined that an instruction to stop the image capture is not given, the processing returns to step S3.

Thereafter, the processing of steps S3 to S5 is repeatedly performed until it is determined in step S5 that an instruction to stop the image capture is given.

On the other hand, if it is determined in step S5 that an instruction to stop the image capture is given, the processing of the camera 11 ends.

<Processing of CCU 15>

Next, the processing performed by the CCU 15 to correspond to the processing of the camera 11 of FIG. 7 will be described with reference to the flowchart of FIG. 8.

This processing is started, for example, when output of a video frame and camera metadata from the camera 11 is started.

In step S51, the CCU 15 starts outputting a video frame and accompanying metadata.

Specifically the signal processing unit 51 starts predetermined video signal processing on the video frame acquired from the camera 11. The signal processing unit 51 also starts processing of supplying the video frame on which the video signal processing has been performed to the feature point detection unit 131 and the subject and region recognition unit 132 of the information processing unit 53 and the output unit 54.

The accompanying metadata generation unit 103 starts processing of generating accompanying metadata by shaping the camera metadata acquired from the camera 11. Then, in synchronization with the supply of video frame from the signal processing unit 51 to the output unit 54, the accompanying metadata generation unit 103 starts processing of supplying the accompanying metadata to the output unit 54. As a result, the video frame and the accompanying metadata indicating the imaging direction of the camera 11 and the state of the lens 22 around the time of capturing the video frame are synchronized with each other and supplied to the output unit 54. The accompanying metadata generation unit 103 starts processing of accumulating the camera metadata acquired from the camera 11 in the buffer 134 of the information processing unit 53.

The output unit 54 arranges the video frame and the accompanying metadata in an output signal of a predetermined format, and starts processing of outputting the output signal to a subsequent device. As a result, the video frame and the accompanying metadata indicating the imaging direction of the camera 11 and the state of the lens 22 around the time of capturing the video frame are embedded in the output signal and associated with each other.

In step S52, the information processing unit 53 starts imaging direction deviation detection processing. Although the details of the imaging direction deviation detection processing will be described later, the information processing unit 53 starts the processing of detecting a deviation of the imaging direction detected by the camera 11 based on the video frame and the camera metadata. The information processing unit 53 calculates a correction value for the reference direction to correct the detected deviation of the imaging direction and the reliability of the correction value, and starts processing of supplying them to the CPU 52. The correction value for the reference direction includes, for example, a correction value for each of the directions of pan angle, tilt angle, and roll angle of the reference direction.

In step S53, the correction data generation unit 102 determines whether or not the correction value for the reference direction has been calculated. When the information processing unit 53 supplies data indicating the correction value for the reference direction and the reliability of the correction value, the correction data generation unit 102 determines that the correction value for the reference direction has been calculated, and then the processing proceeds to step S54.

In step S54, the correction data generation unit 102 determines whether or not the correction value for the reference direction satisfies a predetermined condition. For example, the correction data generation unit 102 calculates a correction amount of the reference direction based on the correction value for the reference direction. The correction amount of the reference direction is represented by the size of the rotation angle between the reference direction before correction and the reference direction after correction. When the correction amount of the reference direction is equal to or greater than a predetermined threshold and the reliability of the correction value in the reference direction is equal to or greater than a predetermined threshold, the correction data generation unit 102 determines that the correction value for the reference direction satisfies a predetermined condition, and then the processing proceeds to step S55.

In step S55, the correction data generation unit 102 outputs correction data of the reference direction. Specifically the correction data generation unit 102 generates correction data based on the correction value for the reference direction (indirectly based on the detected deviation of the imaging direction). The correction data includes, for example, a correction value for each of the directions of pan angle, tilt angle, and roll angle of the reference direction of the camera 11. The correction data generation unit 102 outputs the correction data to the camera 11.

Thereafter, the processing proceeds to step S56.

On the other hand, in step S54, for example, when the correction amount of the reference direction is less than the predetermined threshold or the reliability of the correction value for the reference direction is less than the predetermined threshold, the correction data generation unit 102 determines that the correction value for the reference direction does not satisfy the predetermined condition. Then, the processing of step S55 is skipped, and the processing proceeds to step S56.

Accordingly in this case, the correction data of the reference direction is not output to the camera 11. As a result, it is possible to prevent the reference direction from being corrected in small increments and to prevent errors from occurring in the corrected reference direction.

If it is determined in step S53 that a correction value for the reference direction is not calculated, the processing of steps S54 and S55 is skipped, and the processing proceeds to step S56.

In step S56, the control unit 101 determines whether or not the image capture in the camera 11 is stopped. If it is determined that the image capture in the camera 11 is not stopped, the processing returns to step S53.

Thereafter, the processing from step S53 to step S56 is repeatedly performed until it is determined in step S56 that the image capture in the camera 11 is stopped.

On the other hand, in step S56, when the output of the video frame and the camera metadata from the camera 11 is stopped, the control unit 101 determines that the image capture in the camera 11 is stopped, and the processing of the CCU 15 ends.

<Image Pickup Direction Deviation Detection Processing>

Next, the details of the imaging direction deviation detection processing will be described with reference to the flowchart of FIG. 9.

In step S101, the feature point detection unit 131 detects feature points. Specifically, the feature point detection unit 131 detects feature points in the video frame (hereinafter also referred to as the current video frame) supplied from the signal processing unit 51 by means of a predetermined method, and detects a feature vector for each detected feature point. The feature point detection unit 131 supplies the feature point selection unit 133 and the video state determination unit 136 with data indicating the positions and feature vectors of the feature points in the image frame.

The method of detecting feature points is not particularly limited. For example, methods using the Oriented FAST and Rotated BRIEF (ORB), AKAZE, or deep learning (for example, LF-Net, etc.) may be used.

In step S102, the subject and region recognition unit 132 performs processing of recognizing a subject and a region. For example, the subject and region recognition unit 132 performs object detection and semantic segmentation on the video frame to recognize the position of the subject in the video frame and the type (semantic label) of each region in the video frame. The subject and region recognition unit 132 supplies the feature point selection unit 133 and the video state determination unit 136 with data indicating the results of recognizing the object and region in the video frame.

The methods of object detection and semantic segmentation are not particularly limited. For example, Faster R-CNN, YOLO, or the like may be used for the object detection. For example, Mask R-CNN or the like may be used for the semantic segmentation.

In step S103, the feature point selection unit 133 selects feature points. Specifically, the feature point selection unit 133 selects feature points to be used for feature point matching from among the feature points in the video frame detected by the feature point detection unit 131 based on the results of recognizing the subject and region in the video frame. For example, the feature point selection unit 133 deletes feature points located within the region of a moving object from the detected feature points. Thus, feature points to be used for feature point matching are selected.

Note that examples of the moving object include not only moving objects such as people, vehicles, and balls, but also objects that can move. An example of an object that can move is assumed to be, for example, a temporarily stationary moving object.

The feature point selection unit 133 supplies the feature point matching unit 139 with data indicating the position and feature vector of each selected feature point in the video frame.

In step S104, the camera projection information generation unit 137 generates camera projection information based on the imaging direction detected by the camera 11. Specifically, the camera projection information generation unit 137 acquires the imaging direction information and lens information corresponding to the current video frame from the buffer 134. The camera projection information generation unit 141 generates a camera projection matrix as camera projection information based on the imaging direction of the camera 11 indicated by the imaging direction information and the focal length (that is, angle of view) of the lens 22 indicated by the lens information.

The camera projection matrix is a matrix for projecting, onto the field of view of the camera 11, feature points on the spherical surface S1. In other words, the camera projection matrix is a matrix for transforming the coordinate system of the feature point map (hereinafter referred to as the spherical coordinate system) into the coordinate system of the video frame (hereinafter referred to as the image coordinate system). The camera projection information generation unit 137 supplies the generated camera projection matrix to the reprojection unit 138.

In step S105, the reprojection unit 138 reprojects the feature points in the feature point map. For example, the reprojection unit 138 uses the camera projection matrix to project the feature points in the feature point map onto the field of view of the camera 11 defined by the imaging direction detected by the camera 11 and the angle of view based on the focal length of the lens 22. As a result, feature points in the video frame corresponding to the field of view (the imaging direction detected by the camera 11) are extracted and arranged on the image coordinate system. The reprojection unit 138 supplies the feature point matching unit 139 with data indicating the positions and feature vectors of the extracted feature points in the image coordinate system.

In step S106, the camera state determination unit 135 determines the state of the camera 11. Specifically, the camera state determination unit 135 acquires the imaging direction information and lens information of the camera 11 corresponding to the current video frame from the buffer 134. Based on the imaging direction information and the lens information, the camera state determination unit 135 determines whether or not the camera 11 is in a state suitable for processing of detecting a deviation of the imaging direction.

For example, the camera state determination unit 135 calculates the movement speed (rotational speed) of the imaging direction of the camera 11 based on the imaging direction information. When the movement speed of the imaging direction of the camera 11 is less than a predetermined threshold, the camera state determination unit 135 determines that the camera 11 is in a state suitable for processing of detecting a deviation of the imaging direction. On the other hand, when the movement speed of the imaging direction of the camera 11 is equal to or greater than the predetermined threshold, the camera state determination unit 135 determines that the camera 11 is not in a state suitable for processing of detecting a deviation of the imaging direction. This is because for a high movement speed of the imaging direction of the camera 11, the image frame is blurred, which may result in a reduced accuracy of detection of feature points.

For example, the camera state determination unit 135 determines whether or not the zoom of the camera 11 is being changed on the basis of the lens information. When the zoom of the camera 11 is not being changed, the camera state determination unit 135 determines that the camera 11 is in a state suitable for processing of detecting a deviation of the imaging direction. On the other hand, when the zoom of the camera 11 is being changed, the camera state determination unit 135 determines that the camera 11 is not in a state suitable for processing of detecting a deviation of the imaging direction. This is because when the zoom of the camera 11 is being changed, the image frame is radially blurred, which may result in a reduced accuracy of detection of feature points.

For example, the camera state determination unit 135 determines whether or not the focus of the camera 11 is being changed on the basis of the lens information. When the focus of the camera 11 is not being changed, the camera state determination unit 135 determines that the camera 11 is in a state suitable for processing of detecting a deviation of the imaging direction. On the other hand, when the focus of the camera 11 is being changed, the camera state determination unit 135 determines that the camera 11 is not in a state suitable for processing of detecting a deviation of the imaging direction. This is because when the focus of the camera 11 is being changed, the positions of the feature points of the video frame change, which may result in a reduced accuracy of detection of feature points.

For example, the camera state determination unit 135 determines whether or not the iris of the camera 11 is being changed on the basis of the lens information. When the iris of the camera 11 is not being changed, the camera state determination unit 135 determines that the camera 11 is in a state suitable for processing of detecting a deviation of the imaging direction. On the other hand, when the iris of the camera 11 is being changed, the camera state determination unit 135 determines that the camera 11 is not in a state suitable for processing of detecting a deviation of the imaging direction. This is because when the iris of the camera 11 is being changed, the background of the video frame is blurred, which may result in a reduced accuracy of detection of feature points.

For example, the camera state determination unit 135 detects the focal length of the camera 11 based on the lens information. When the focal length of the camera 11 is less than a predetermined threshold, that is, when the size of the angle of view of the camera 11 is equal to or greater than a predetermined threshold, the camera state determination unit 135 determines that the camera 11 is in a state suitable for processing of detecting a deviation of the imaging direction. On the other hand, when the focal length of the camera 11 is equal to or greater than the predetermined threshold, that is, when the size of the angle of view of the camera 11 is less than the predetermined threshold, the camera state determination unit 135 determines that the camera 11 is not in a state suitable for processing of detecting a deviation of the imaging direction. This is because for a closed-up video frame (a video frame with a narrow angle of view), false detection of feature points is likely to occur.

For example, the camera state determination unit 135 calculates the rear depth of field of the camera 11 based on the focal length, in-focus distance, and iris value of the lens 22 indicated in the lens information. When the rear depth of field of the camera 11 is equal to or greater than a predetermined threshold, the camera state determination unit 185 determines that the camera 11 is not in a state suitable for processing of detecting a deviation of the imaging direction. On the other hand, when the rear depth of field of the camera 11 is Less than the predetermined threshold, the camera state determination unit 135 determines that the camera 11 is not in a state suitable for processing of detecting a deviation of the imaging direction. This is because for a small rear depth of field, the background of the video frame is highly blurred, which may result in a reduced accuracy of detection of feature points.

For example, when the camera state determination unit 135 determines that the camera 11 is in a state suitable for processing of detecting a deviation of the imaging direction for all the conditions, the camera state determination unit 135 generates a camera state flag indicating that the camera 11 is in a state suitable for processing of detecting the imaging direction. On the other hand, when the camera state determination unit 135 determines that the camera 11 is not in a state suitable for processing of detecting a deviation of the imaging direction for at least one of the conditions, the camera state determination unit 135 generates a camera state flag indicating that the camera 11 is not in a state suitable for processing of detecting the imaging direction. The camera state determination unit 135 supplies the camera state flag to the video state determination unit 136.

In step S107, the video state determination unit 136 determines the state of the video frame. Specifically the video state determination unit 136 determines whether or not the video frame is in a state suitable for processing of detecting a deviation of the imaging direction, based on the result of recognizing the subject and region of the video frame and the result of detecting feature points.

For example, the video Mate determination unit 136 detects a distribution of feature points in the video frame. For example, the video state determination unit 136 generates an enveloping polyline for the group of feature points detected by the feature point detection unit 131, and calculates the area of a region surrounded by the enveloping polyline (hereinafter referred to as the enveloping region). If the area ratio of the enveloping region in the video frame is equal to or greater than a predetermined threshold, the video state determination unit 136 determines that the video frame is in a state suitable for processing of detecting a deviation of the imaging direction. On the other hand, if the area ratio of the enveloping region in the video frame is less than the predetermined threshold, the video state determination unit 136 determines that the video frame is not in a state suitable for processing of detecting a deviation of the imaging direction. This is because the distribution of feature points in the video frame is biased, which may result in a reduced accuracy of feature point matching.

For example, as illustrated in FIG. 10, when the sky occupies most of the video frame, the distribution of feature points is biased, and the number of feature points is reduced, which may result in a reduced accuracy of feature point matching. Therefore, it is determined that this video frame is not in a state suitable for processing of detecting a deviation of the imaging direction.

For example, the video state determination unit 136 calculates the area of a region in which a moving object appears (hereinafter referred to as a moving object region) in the video frame. If the area ratio of the moving object region in the video frame is less than a predetermined threshold, the video state determination unit 136 determines that the video frame is in a state suitable for processing of detecting a deviation of the imaging direction. On the other hand, if the area ratio of the moving object region in the video frame is equal to or greater than the predetermined threshold, the video state determination unit 136 determines that the video frame is not in a state suitable for processing of detecting a deviation of the imaging direction. This is because there are a lot of feature points that may move in the video frame, which may result in a reduced accuracy of feature point matching.

For example, when the video state determination unit 136 determines that the video frame is in a state suitable for processing of detecting a deviation of the imaging direction for all the conditions, the video state determination unit 136 generates a video state flag indicating that the video frame is in a state suitable for processing of detecting the imaging direction. On the other hand, when the video state determination unit 136 determines that the video frame is not in a state suitable for processing of detecting a deviation of the imaging direction for at least one of the conditions, the video state determination unit 136 generates a video state flag indicating that the video frame is not in a state suitable for processing of detecting the imaging direction. The video state determination unit 136 supplies the image information flag and the camera state flag to the feature point matching unit 139.

In step S108, the feature point matching unit 139 determines whether or not a deviation of the imaging direction can be detected. Based on the camera state flag and the video state flag, the feature point matching unit 139 determines whether or not both the camera 11 and the image frame are in a state suitable for processing of detecting a deviation of the imaging direction. When both the camera 11 and the video frame are in a state suitable for processing of detecting a deviation of the imaging direction, the feature point matching unit 139 determines that a deviation of the imaging direction can be detected, and then the processing proceeds to step S109.

In step S109, the feature point matching unit 139 performs feature point matching. Specifically, the feature point matching unit 139 makes a match of feature points between the detected feature point group detected from the video frame and the reprojected feature point group reprojected from the feature point map, thereby associating the feature points. The feature point matching unit 139 supplies the deviation detection unit 140 and the feature point map update unit 142 with data indicating the result of feature point matching.

The method of the feature point matching is not particularly limited. For example, RANSAC, brute force search, or deep learning matching (for example, SuperGlue) may be used.

In step S110, the deviation detection unit 140 detects a deviation of the imaging direction.

For example, FIG. 11 illustrates an example of the result, of detecting feature points performed by the feature point detection unit 131. Specifically, it illustrates an example of the result of detecting feature points in the video frame captured by the camera 11 when facing in the reference direction.

For example, FIG. 12 illustrates an example of the feature points reprojected by the reprojection unit 138. In this example, the imaging direction detected by the camera 11 is −7 degrees in the panning direction (7 degrees counterclockwise in the panning direction) with respect to the reference direction, and the feature points in the detected imaging direction is reprojected.

Therefore, in this case, the difference between the imaging direction detected by the camera 11 and the actual imaging direction (FIG. 11) of the camera 11, that is, the deviation of the imaging direction is −7 degrees.

The deviation detection unit 140 detects this deviation of the imaging direction by means of a predetermined method. Specifically, on the basis of the imaging direction based on the video frame, the deviation detection unit 140 detects the deviation of the imaging direction detected by the camera 11.

The method of detecting a deviation of the imaging direction is not particularly limited. For example, the deviation detection unit 140 detects a deviation of the imaging direction by using the Kabsch algorithm. The Kabsch algorithm is a method of calculating a rotation matrix that minimizes the root-mean square deviation (RSMD) between two matched point clouds in 3D space.

An example of the method of detecting a deviation of the imaging direction by using the Kabsch algorithm will now be described.

For example, let (xn, yn) be the coordinates in the image coordinate system of a group of feature points detected from a video frame (detected feature point group) from among N pairs of feature points associated by the feature point matching. On the other hand, let (Xn, Yn) be the coordinates in the image coordinate system of a group of feature points reprojected from a feature point map (reprojected feature point group). Here, n=1, 2, . . . , N.

Let f be the focal length of the lens 22 when the current video frame is captured. Strictly speaking, the focal length f is converted into the same unit system as the image coordinate system based on the size and number of pixels of the image sensor of the camera 11.

First, 3×N matrix P and matrix Q are defined as represented by the following Equations (1) to (8).

[Math. 1]

$$P = \begin{pmatrix} P_{11} & \dots & P_{1N} \\ P_{21} & \dots & P_{2N} \\ P_{31} & \dots & P_{3N} \end{pmatrix} \tag{1}$$

$$P_{1n} = x_n / \sqrt{x_n^2 + y_n^2 + f^2} \tag{2}$$

$$P_{2n} = y_n / \sqrt{x_n^2 + y_n^2 + f^2} \tag{3}$$

$$P_{3n} = f / \sqrt{x_n^2 + y_n^2 + f^2} \tag{4}$$

$$Q = \begin{pmatrix} Q_{11} & \dots & Q_{1N} \\ Q_{21} & \dots & Q_{2N} \\ Q_{31} & \dots & Q_{3N} \end{pmatrix} \tag{5}$$

$$Q_{1n} = X_n / \sqrt{X_n^2 + Y_n^2 + f^2} \tag{6}$$

$$Q_{2n} = Y_n / \sqrt{X_n^2 + Y_n^2 + f^2} \tag{7}$$

$$Q_{3n} = f / \sqrt{X_n^2 + Y_n^2 + f^2} \tag{8}$$

The deviation detection unit 140 calculates a 3×3 matrix H represented by the following Equations (9) and (10).

[Math. 2]

$$H = \begin{pmatrix} H_{11} & H_{12} & H_{13} \\ H_{21} & H_{22} & H_{23} \\ H_{31} & H_{32} & H_{33} \end{pmatrix} \tag{9}$$

$$H_{ij} = \sum_{n=1}^{N} P_{in} Q_{jn} \tag{10}$$

Next, the deviation detection unit 140 performs singular value decomposition of the matrix H as represented by the following Equation (11).

$$H = USV^T \tag{11}$$

Here, U, S, V are 3×3 matrices. The matrix S is a diagonal matrix in which singular values are set to the diagonal elements.

Next, the deviation detection unit 140 uses the matrix U and the matrix V to calculate a determinant d of the following Equation (12).

$$d = \det(VU^T) \tag{12}$$

Next, the deviation detection unit 140 calculates a 3×3 matrix R of the following Equation (13).

[Math. 3]

$$R = V \begin{pmatrix} 1 & 0 & 0 \\ 0 & 1 & 0 \\ 0 & 0 & d \end{pmatrix} U^T \tag{13}$$

Here, the matrix R is a rotation matrix that represents a deviation of the imaging direction.

The deviation detection unit 140 calculates a correction value for the reference direction based on the detected deviation of the imaging direction, and calculates the reliability of the correction value for the reference direction. For example, the deviation detection unit 140 normalizes the number of detected feature points or the error in the feature point matching to a value range of 0.0 to 1.0 by using a sigmoid function, to calculate as the resulting value the reliability of the correction value for the reference direction.

The deviation detection unit 140 also corrects the imaging direction based on the detected deviation of the imaging direction. For example, the deviation detection unit 140 acquires the imaging direction information corresponding to the current video frame from the buffer 134. The deviation detection unit 140 corrects, based on the detected deviation of the imaging direction, the imaging direction detected by the camera 11 indicated by the imaging direction information.

For example, the deviation detection unit 140 may detect, based on the result of the feature point matching, the positions of the group of feature points in the video frame (detected feature point group) in the feature point map, thereby directly detecting the imaging direction with the deviation corrected.

The deviation detection unit 140 supplies the CPU 52 with data indicating the correction value for the reference direction and the reliability of the correction value. The deviation detection unit 140 supplies the camera projection information generation unit 141 with data indicating the corrected imaging direction.

In step S111, the camera projection information generation unit 141 generates camera projection information based on the imaging direction with the deviation corrected. Specifically the camera projection information generation unit 141 acquires the lens information corresponding to the current video frame from the buffer 134. The camera projection information generation unit 141 calculates a camera projection matrix based on the imaging direction corrected by the deviation detection unit 140 and the focal length (that is, angle of view) of the lens 22 included in the acquired lens information. The camera projection information generation unit 141 supplies the camera projection information to the feature point map update unit 142.

The camera projection information in step S104 described above is generated on the basis of the imaging direction detected by the camera 11 and having a deviation. By contrast, the camera projection information in this step is generated on the basis of the imaging direction with the deviation corrected.

In step S112, the feature point map update unit 142 updates the feature point map. Specifically based on the result of the feature point matching, the feature point map update unit 142 extracts feature points that do not correspond to the feature points in the feature point map, from among the feature points detected in the video frame. In other words, the feature point map update unit 142 extracts new feature points that are not registered in the feature point map. The feature point map update unit 142 uses the camera projection matrix generated by the camera projection information generation unit 141 to calculate the direction (latitude and longitude) when the extracted feature points are projected onto the spherical surface S1. The feature point map update unit 142 updates the feature point map by adding feature point data including the directions of the extracted feature points and the feature vectors to the feature point map.

For example, when the number of feature points in the feature point map exceeds a predetermined threshold, the feature point map update unit 142 may decimate the feature points. In this case, the feature point map update unit 142 decimates the feature points from regions with high density of feature points so that the feature points are distributed as evenly as possible on the spherical surface S1.

Thereafter, the processing returns to step S101 and processing subsequent to step S101 is performed.

On the other hand, in step S108, when at least one of the camera 11 and the video frame is not in a state suitable for processing of detecting a deviation of the imaging direction, the feature point matching unit 139 determines that a deviation of the imaging direction cannot be detected. Thereafter, the processing returns to step S101 and processing subsequent to step S101 is performed. Accordingly, in this case, the processing of detecting a deviation of the imaging direction is not performed.

As described above, the accuracy of detection of the imaging direction can be improved by correcting the reference direction of the camera 11 by means of only the image processing of the video frame without using a device such as a camera platform having a specific function such as an encoder.

When the state of the camera 11 and the state of the video frame are not suitable for processing of detecting a deviation of the imaging direction, the processing of detecting a deviation of the imaging direction is not performed, and the reference direction is not corrected. As a result, the reliability of the processing of correcting the reference direction is improved, and the accuracy of detection of the imaging direction of the camera 11 is more improved.

In addition, when a predetermined condition is satisfied, the reference direction of the camera 11 is corrected so as to change gradually and smoothly. This makes it possible to correct the reference direction without giving a sense of discomfort to the user viewing the video from the camera 11.

The processing of detecting the imaging direction with the motion sensor 32, which is performed at high speed and immediately is performed by the camera 11. On the other hand, the image processing with a large processing load, processing time, and processing cycle is performed by the CCU 15. This makes it possible to miniaturize the camera 11 and reduce the power consumption of the camera 11.

3. Modification Examples

Hereinafter, modification examples of the above-described embodiments of the present technology will be described.

<Modification Example of Sharing of Processing>

For example, it is possible to change the sharing of processing between the camera 11 and the CCU 15. For example, the camera 11 may perform part or all of the processing in the CPU 52 and the information processing unit 53 of the CCU 15.

<Processing for Camera 11 Translating>

Processing has been described above on the premise that the camera 11 does not translate. On the other hand, the present technology can also be applied for the camera 11 translating with being placed on a crane or suspended by a wire, for example.

Even for the camera 11 translating, the basic configuration of the information processing system 1 is the same as the configuration described above. In the following, portions different from the processing described above will be mainly described.

For example, the imaging direction detection unit 72 of the camera 11 detects the translational position of the camera 11 based on the acceleration detected by the motion sensor 32. Specifically, for example, the imaging direction detection unit 72 detects the position in the translational direction (hereinafter referred to as the imaging position) by cumulatively calculating the acceleration detected by the motion sensor 32, and cumulatively calculating the amount of movement in the translational direction with a reference origin that is the position of the camera 11 at the time when activated.

The camera metadata generation unit 73 of the camera 11 generates camera metadata including imaging direction information, imaging position information, and lens information of the camera 11, and outputs the generated camera metadata to the CCU 15.

Meanwhile, when the amount of movement of the camera 11 in the translational direction is calculated from the acceleration detected by the motion sensor 32, the acceleration is integrated twice (acceleration→velocity→distance). Accordingly, an accumulated error due to the error of the motion sensor 32 also occurs in the imaging position of the camera 11. A drift of the reference origin occurs due to the accumulated error of the imaging position.

For this, the reference origin is corrected in the same manner as the correction of the reference direction described above.

In this case, instead of the feature point map represented by the positions of the feature points on the spherical surface S1 described above, a feature point map represented by the positions of the feature points in three-dimensional space is used. For example, a feature point map used in simultaneous localization and mapping (SLAM) is used.

The deviation detection unit 140 of the CCU 15 uses, for example, a method of calculating both translation and angle as used in SLAM or structure from motion (SEM), that is, a method of simultaneously performing triangulation and rotation detection. As such, the deviation detection unit 140 detects the imaging direction and imaging position of the camera 11, and also detects deviations of the imaging direction and imaging position.

The correction data generation unit 102 of the CCU 15 generates correction data for correcting the reference direction and reference position of the camera 11 based on the detected deviations of the imaging direction and imaging position.

The imaging direction detection unit 72 of the camera 11 corrects the reference direction and reference position of the camera 11 based on the correction data. At this time, the camera 11 corrects the reference direction and the reference position based on the same conditions as those used in step S3 of FIG. 7. The imaging direction detection unit 72 also corrects the reference direction and the reference position so that they change gradually and smoothly by means of, for example, alpha-blending.

Based on the imaging direction and imaging position detected by the camera 11 and the focal length of the lens 22, the camera projection information generation unit 137 of the CCU 15 generates camera projection information for reprojecting the feature points in the feature point map in the three-dimensional space onto the field of view of the camera 11.

Based on the imaging direction and imaging position corrected by the deviation detection unit 140 and the focal length of the lens 22, the camera projection information generation unit 141 of the CCU 15 generates camera projection information for reprojecting the feature points in the feature point map in the three-dimensional space onto the field of view of the camera 11.

Other processing is the same as the processing described above. For example, the same applies to the conditions for determining the states of the camera 11 and the video frame, which are the conditions for performing the processing of detecting deviations of the imaging direction and imaging position.

<Modification Example of Correction Data>

For example, the correction data generation unit 102 of the CCU 15 may generate correction data indicating the deviation of the imaging direction detected by the deviation detection unit 140 instead of the correction value for the reference direction, and output the generated correction data to the camera 11.

In this case, the imaging direction detection unit 72 of the camera 11 corrects the reference direction based on the detected imaging direction. For example, the deviation detection unit 140 of the CCU 15 calculates the reliability of the detected deviation of the imaging direction instead of the reliability of the correction value for the reference direction, and supplies the calculated reliability to the CPU 52. The correction data generation unit 102 determines whether or not to output the correction data to the camera 11 based on the reliability of the deviation of the imaging direction. The reliability of the correction value for the reference direction and the reliability of the deviation of the imaging direction are substantially the same.

For example, the correction data generation unit 102 may calculate a correction value for the reference direction based on the deviation of the imaging direction detected by the deviation detection unit 140.

Other Modification Examples

For example, the output unit 54 may output the accompanying metadata in association with the output signal instead of embedding the accompanying metadata in the output signal.

For example, the accompanying metadata generation unit 103 may add the correction data for the reference direction and reference position to the accompanying metadata. Then, a device downstream of the CCU 15 may correct on the basis of the correction data the imaging direction and imaging position detected by the camera 11.

4. Others

<Configuration Example of Computer>

The series of processing described above can be executed by hardware or can be executed by software. When the series of steps of processing is executed by software, a program of the software is installed in a computer. Here, the computer includes a computer embedded in dedicated hardware or, for example, a general-purpose personal computer capable of executing various functions by installing various programs.

FIG. 13 is a block diagram illustrating an example of a hardware configuration of a computer that executes the above-described series of processing according to a program.

In a computer 1000, a central processing unit (GPO) 1001, a read only memory (ROM) 1002, and a random access memory (RAM) 1003 are connected to each other by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 is constituted of an input switch, a button, a microphone, an imaging element, or the like. The output unit 1007 is constituted of a display a speaker, or the like. The recording unit 1008 is constituted of a hard disk, a nonvolatile memory, or the like. The communication unit 1009 is constituted of a network interface or the like. The drive 1010 drives a removable medium 1011 such as a magnetic disk, an optical disc, a magneto-optical disk, or a semiconductor memory.

In the computer 1000 configured as described above, for example, the CPU 1001 loads a program recorded in the recording unit 1008 into the RAM 1003 via the input/output interface 1005 and the bus 1004 and executes the program to perform the series of processing described above.

The program executed by the computer 1000 (CPU 1001) may be recorded on, for example, the removable medium 1011 as a package medium or the like so as to be provided. The program can also be provided via a wired or wireless transmission medium such as a local area network, the Internet, or digital satellite broadcasting.

In the computer 1000, the program may be installed in the recording unit 1008 via the input/output interface 1005 by inserting the removable medium 1011 into the drive 1010. Furthermore, the program can be received by the communication unit 1009 via a wired or wireless transfer medium to be installed in the recording unit 1008. In addition, the program may be installed in advance in the ROM 1002 or the recording unit 1008.

The program executed by a computer may be a program that performs processing chronologically in the order described in the present specification or may be a program that performs processing in parallel or at a necessary timing such as a called time.

In the present specification, a system means a set of a plurality of constituent elements (devices, modules (components), or the like) and all the constituent elements may or may not be included in a same casing. Accordingly a plurality of devices accommodated in separate casings and connected via a network and one device in which a plurality of modules is accommodated in one casing both constitute systems.

Further, embodiments of the present technology are not limited to the above-mentioned embodiments and various modifications may be made without departing from the scope and spirit of the present technology.

For example, the present technology may be configured as cloud computing in which a plurality of devices share and cooperatively process one function via a network.

In addition, each step described in the above flowchart can be executed by one device or executed in a shared manner by a plurality of devices.

Furthermore, in a case in which one step includes a plurality of kinds of processing, the plurality of kinds of processing included in the one step can be executed by one device or executed in a shared manner by a plurality of devices.

<Combination Example of Configuration>

The present technology can be configured as follows.

(1)

An information processing device including a deviation detection unit that detects a deviation of a first imaging direction based on a captured image, the first imaging direction being an imaging direction of an imaging device that is detected by the imaging device that captures an image to obtain the captured image, the imaging direction being associated with the captured image.

(2)

The information processing device according to (1), further including a correction data generation unit that generates, based on the detected deviation, correction data for correcting a reference direction as a reference for the first imaging direction.

(3)

The information processing device according to (2), wherein the correction data generation unit outputs the correction data to the imaging device.

(4)

The information processing device according to (3), wherein when the deviation is equal to or greater than a predetermined threshold, the correction data generation unit outputs the correction data to the imaging device.

(5)

The information processing device according to (3) or (4), wherein the deviation detection unit calculates a reliability of the detected deviation or a reliability of a correction value for the reference direction based on the deviation, and when the reliability is equal to or greater than a predetermined threshold, the correction data generation unit outputs the correction data to the imaging device.

(6)

The information processing device according to any one of (2) to (5), further including an output unit that generates a predetermined output signal including the captured image, and outputs the corrected data in association with the captured image included in the output signal.

(7)

The information processing device according to any one of (2) to (6), wherein the first imaging direction is detected by integrating an amount of change in orientation of the imaging device with respect to the reference direction.

(8)

The information processing device according to any one of (1) to (7), wherein the first imaging direction is included in metadata output from the imaging device and associated with the captured image.

(9)

The information processing device according to (8), wherein the metadata further includes lens information that is information on a lens of the imaging device.

(10)

The information processing device according to (9), further including an imaging device state detection unit that detects a state of the imaging device based on the metadata, wherein when the state of the imaging device satisfies a predetermined condition, the deviation detection unit does not detect the deviation.

(11)

The information processing device according to (10), wherein when a movement speed of the first imaging direction is equal to or greater than a predetermined threshold, when the imaging device is changing zoom, focus, or iris, when a focal length of the lens is less than a predetermined threshold, or when a depth of field of the lens is less than a predetermined threshold, the deviation detection unit does not detect the deviation.

(12)

The information processing device according to any one of (1) to (11), wherein when the captured image satisfies a predetermined condition, the deviation detection unit does not detect the deviation.

(13)

The information processing device according to (12), wherein when a distribution of feature points in the captured image is biased or when a ratio of a region of a moving object in the captured image is equal to or greater than a predetermined threshold, the deviation detection unit does not detect the deviation.

(14)

The information processing device according to any one of (1) to (13), wherein the deviation detection unit detects, as the deviation, a difference between the first imaging direction and a second imaging direction that is an imaging direction of the imaging device detected on the basis of the captured image.

(15)

The information processing device according to (14), including:

a feature point detection unit that detects feature points in the captured image; and a feature point matching unit that makes a match between feature points in a feature point map indicating a distribution of the feature points around the imaging device and the feature points in the captured image, wherein the deviation detection unit detects the deviation based on a result of making a match between the feature points in the feature point map and the feature points in the captured image.

(16)

The information processing device according to (15), wherein the feature point matching unit makes a match between the feature points in the feature point map corresponding to the first imaging direction and the feature points in the captured image.

(17)

The information processing device according to (15) or (16), wherein the feature point matching unit makes a match between the feature points in the feature point map and feature points in the captured image excluding feature points in a region of a moving body.

(18)

The information processing device according to any one of (15) to (17), further including a feature point map update unit that updates the feature point map based on the feature points in the captured image.

(19)

The information processing device according to any one of (15) to (18), wherein the deviation detection unit detects the second imaging direction based on a result of making a match between the feature points in the feature point map and the feature points in the captured image.

(20)

The information processing device according to any one of (1) to (19), wherein the deviation detection unit performs processing of detecting the deviation at a cycle longer than a cycle of capturing the captured image.

(21)

An information processing method including detecting, by an information processing device, a deviation of an imaging direction of an imaging device based on a captured image, the imaging direction being detected by the imaging device that captures an image to obtain the captured image, the imaging direction being associated with the captured image.

(22)

An information processing system including an imaging device that captures an image to obtain a captured image; and an information processing device that controls the imaging device, wherein the imaging device includes an imaging direction detection unit that detects an imaging direction of the imaging device, and a metadata generation unit that generates metadata including the imaging direction detected by the imaging direction detection unit, and outputs the metadata in association with the captured image to the information processing device, and the information processing device includes a deviation detection unit that detects, based on the captured image, a deviation of the imaging direction included in the metadata.

(23)

The information processing system according to (22), wherein the information processing device further includes a correction data generation unit that generates, based on the detected deviation, correction data for correcting a reference direction as a reference of the imaging direction, and outputs the correction data to the imaging device, and the imaging direction detection unit corrects the reference direction based on the correction data.

(24)

The information processing system according to (23), wherein when a movement speed of the imaging direction is equal to or greater than a predetermined threshold, the imaging direction detection unit corrects the reference direction.

(25)

The information processing system according to (23) or (24), wherein the imaging direction detection unit continuously corrects the reference direction in a plurality of times.

The advantageous effects described in the present specification are merely exemplary and are not limited, and other advantageous effects may be obtained.

REFERENCE SIGNS LIST

1 Information processing system
11 Camera
15 CCU
21 Main body
22 Lens
31 Signal processing unit
32 Motion sensor
33 CPU
51 Signal processing unit
52 CPU
53 Information processing unit
54 Output unit
71 Control unit
72 Imaging direction detection unit
73 Camera metadata generation unit
101 Control unit
102 Correction data generation unit
103 Accompanying metadata generation unit
131 Feature point detection unit
132 Subject and region recognition unit
133 Feature point selection unit
135 Camera state determination unit
136 Video state determination unit
137 Camera projection information generation unit
138 Reprojection unit
139 Feature point matching unit
140 Deviation detection unit
141 Camera projection information generation unit
142 Feature point map update unit
201 Image sensor

The invention claimed is:

1. An information processing device comprising:

circuitry configured to detect a deviation of a first imaging direction based on a captured image, the first imaging direction being an imaging direction of an imaging device that is detected by the imaging device that captures an image to obtain the captured image, the imaging direction being associated with the captured image, wherein the circuitry detects the deviation by using a rotation matrix calculated to minimize a root-mean square deviation between matched point clouds.

2. The information processing device according to claim 1, wherein the circuitry is further configured to generate, based on the detected deviation, correction data for correcting a reference direction as a reference for the first imaging direction.

3. The information processing device according to claim 1, wherein the first imaging direction is included in metadata output from the imaging device and associated with the captured image.

4. The information processing device according to claim 1, wherein, when the captured image satisfies a predetermined condition, the circuitry does not detect the deviation.

5. The information processing device according to claim 1, wherein the circuitry detects, as the deviation, a difference between the first imaging direction and a second imaging direction that is an imaging direction of the imaging device detected based on the captured image.

6. The information processing device according to claim 1, wherein the circuitry is further configured to perform processing of detecting the deviation at a cycle longer than a cycle of capturing the captured image.

7. The information processing device according to claim 2, wherein the circuitry is further configured to output the correction data to the imaging device.

8. The information processing device according to claim 2, wherein the circuitry is further configured to generate a predetermined output signal including the captured image, and output the corrected data in association with the captured image included in the output signal.

9. The information processing device according to claim 2, wherein the first imaging direction is detected by integrating an amount of change in orientation of the imaging device with respect to the reference direction.

10. The information processing device according to claim 7, wherein, when the deviation is equal to or greater than a predetermined threshold, the circuitry outputs the correction data to the imaging device.

11. The information processing device according to claim 7, wherein the circuitry is further configured to calculate a reliability of the detected deviation or a reliability of a correction value for the reference direction based on the deviation, and wherein, when the reliability of the detected deviation or a reliability of a correction value for the reference direction is equal to or greater than a predetermined threshold, the circuitry outputs the correction data to the imaging device.

12. The information processing device according to claim 3, wherein the metadata further includes lens information that is information on a lens of the imaging device.

13. The information processing device according to claim 12, wherein the circuitry is further configured to detect a state of the imaging device based on the metadata, and wherein, when the state of the imaging device satisfies a predetermined condition, the circuitry does not detect the deviation.

14. The information processing device according to claim 13, wherein, when a movement speed of the first imaging direction is equal to or greater than a predetermined threshold, when the imaging device is changing zoom, focus, or iris, when a focal length of the lens is less than a predetermined threshold, or when a depth of field of the lens is less than a predetermined threshold, the circuitry does not detect the deviation.

15. The information processing device according to claim 4, wherein, when a distribution of feature points in the captured image is biased or when a ratio of a region of a moving object in the captured image is equal to or greater than a predetermined threshold, the circuitry does not detect the deviation.

16. The information processing device according to claim 5, wherein the circuitry is further configured to detect feature points in the captured image, make a match between feature points in a feature point map indicating a distribution of the feature points around the imaging device and the feature points in the captured image, and detect the deviation based on a result of making a match between the feature points in the feature point map and the feature points in the captured image.

17. The information processing device according to claim 16, wherein the circuitry makes the match between the feature points in the feature point map corresponding to the first imaging direction and the feature points in the captured image.

18. The information processing device according to claim 16, wherein the circuitry makes the match between the feature points in the feature point map and feature points in the captured image excluding feature points in a region of a moving body.

19. The information processing device according to claim 16, wherein the circuitry is further configured to update the feature point map based on the feature points in the captured image.

20. The information processing device according to claim 16, wherein the circuitry is further configured to detect the second imaging direction based on a result of making the match between the feature points in the feature point map and the feature points in the captured image.

21. An information processing method, executed by an information processing device, the method comprising detecting a deviation of an imaging direction of an imaging device based on a captured image, the imaging direction being detected by the imaging device configured to capture an image to obtain the captured image, the imaging direction being associated with the captured image, wherein the deviation is detected by using a rotation matrix calculated to minimize a root-mean square deviation between matched point clouds.

22. An information processing system comprising:

an imaging device configured to capture an image to obtain a captured image; and an information processing device configured to control the imaging device, wherein the imaging device includes circuitry configured to detect an imaging direction of the imaging device, generate metadata including the detected imaging direction, and output the metadata in association with the captured image to the information processing device, and wherein the information processing device includes circuitry configured to detect, based on the captured image, a deviation of the imaging direction included in the metadata, and wherein the circuitry of the information processing device detects the deviation by using a rotation matrix calculated to minimize a root-mean square deviation between matched point clouds.

23. The information processing system according to claim 22, wherein the circuitry of the information processing device is further configured to generate, based on the detected deviation, correction data for correcting a reference direction as a reference of the imaging direction, and output the correction data to the imaging device, and wherein the circuitry of the imaging device is further configured to correct the reference direction based on the correction data.

24. The information processing system according to claim 23, wherein, when a movement speed of the imaging direction is equal to or greater than a predetermined threshold, the circuitry of the imaging device corrects the reference direction.

25. The information processing system according to claim 23, wherein the circuitry of the imaging device continuously corrects the reference direction in a plurality of times.

* * * * *